W. Hamilton.
Excavator.

Nº 25,408.  Patented Sep. 13, 1869.

Witnesses:  Inventor:

UNITED STATES PATENT OFFICE.

WM. HAMILTON, OF ST. CATHERINE, MISSOURI.

EXCAVATOR.

Specification of Letters Patent No. 25,408, dated September 13, 1859.

*To all whom it may concern:*

Be it known that I, WILLIAM HAMILTON, of St. Catharine, in the county of Linn and State of Missouri, have invented an Improved Machine for Excavating Earth, &c.; and I do hereby declare that the same is fully described and represented in the following specification and accompanying drawings, of which—

Figure 1:
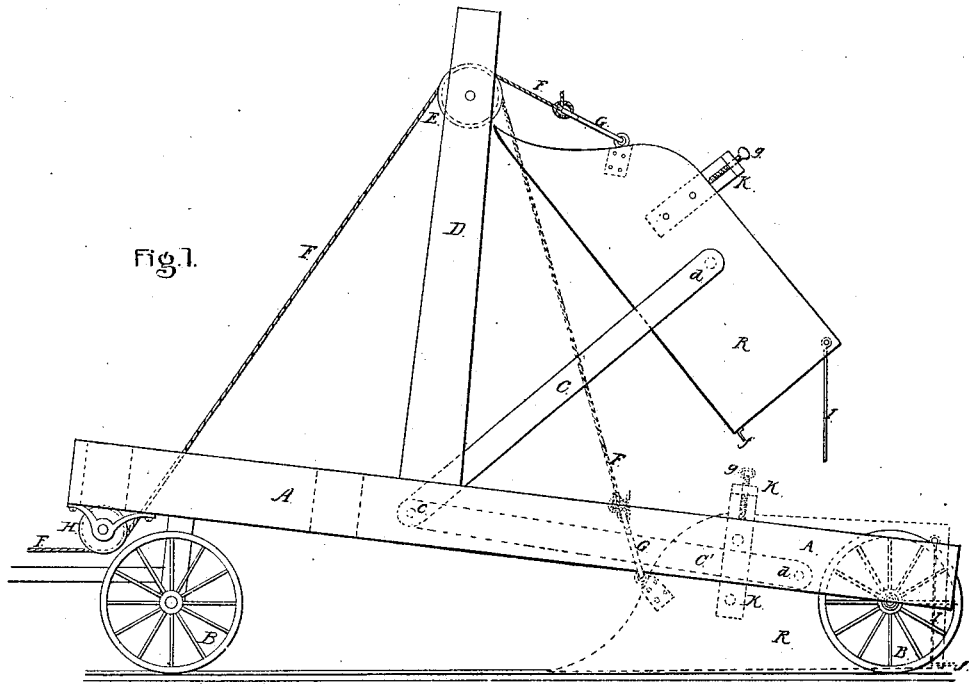
Figure 2:
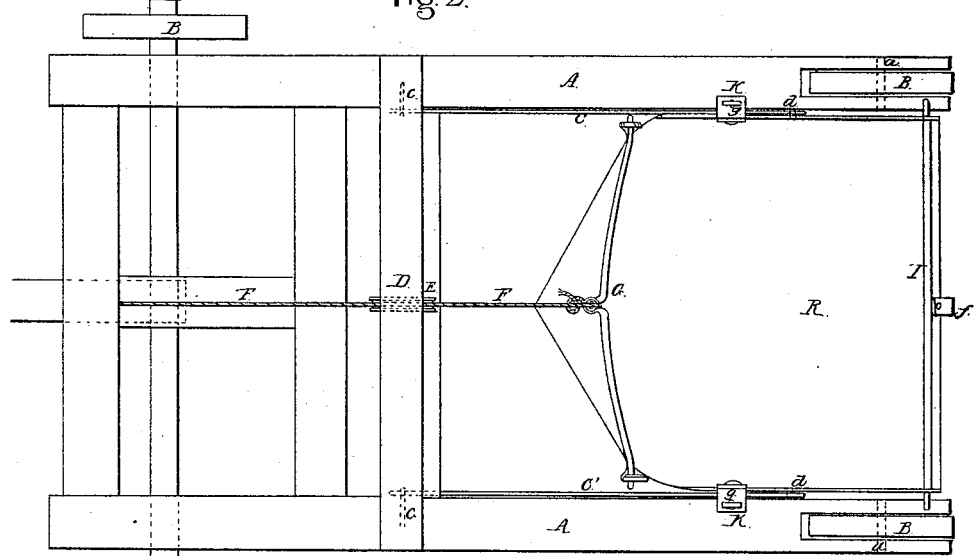

Figure 1 denotes a side elevation of the said machine, the same showing the shovel or excavator as raised to its highest elevation, the red lines in the said figure indicating a side elevation of the excavator as depressed to its lowest position. Fig. 2 a top view of the machine.

The nature of my invention consists in a peculiar construction of the frame of the machine, and the application of the rear wheels thereto, in combination with the novel arrangement of the devices hereinafter described for guiding and elevating the shovel or excavator, whereby great facility is attained in the elevation, dumping and removal of the earth. Also in a peculiar arrangement and application of devices for supporting the shovel or excavator, and regulating the depth of the cut thereof, the same not only allowing the excavator to enter the ground a proper distance, but admitting it to be freely raised into a suitable position for dumping the earth or other matter into a cart or other suitable vehicle.

In constructing my improved machine, I have sought to obviate the defects existing in most if not all other machines heretofore constructed, and which have led to an almost, if not an entire abandonment of them. It is well known to engineers and others engaged in the construction of railways, that it has been impossible to excavate hard or clayey soil with the machines heretofore used; such have been their construction and arrangement that they could not be made to automatically adjust themselves and produce the depth of cut required. This difficulty I have completely overcome in my machine. Another difficulty has been that there has been no adequate or expeditious means of conveying away the earth as fast as it might be raised upward by the excavator. This by my construction and arrangement of parts I have completely remedied.

In the drawings, A denotes the main frame of the machine, as supported upon four wheels, B, B, B, B. Such frame should be constructed of hard wood, and made very strong so as to be capable of sustaining the great pressure to which it may be subjected. The width of it should be about four feet. The rear end of each of the side pieces or timbers A, A, is bifurcated or recessed for the reception of a wheel B, the same being arranged therein and made to turn on a journal or pin, *a*, extending transversely through the two arms or forks as shown in the drawings. The object of this construction of the frame and the arrangement of the wheels is to enable a common cart to be backed or pushed over such wheels and frame. It will be obvious that were the rear wheels B, B, attached to a common axle, such axle would not only prevent the excavator R from being operated, but would also prevent a horse or other animal from being backed between the wheels in order to get the cart under the end of the excavator when such excavator was loaded and raised upward. The said excavator I usually construct of iron, and of the form as shown in the drawings. Moreover, for the purpose of guiding and supporting the said excavator, I attach (by means of pivots, *c*, *d*,) to each vertical side of it, one end of a strong, rigid bar or arm C, or C′, (the same being made of metal or other suitable material) while its other end is pivoted to the inner side of the frame A, as shown in the drawings. These arms or radial bars not only serve to prevent the shovel or excavator from being warped, or twisted while entering the ground, but also to guide and direct it while being either elevated or depressed as circumstances may require.

Near the front end of the frame A, and vertically thereon, I erect a gallows frame D, which supports a pulley E, as shown in the drawings. Around this pulley, a rope F, is carried, one end of it being attached to a bail G, while the other end is carried around another pulley H, attached near the front end of the frame A. The bail G, is attached near the front end of the excavator R and on each side thereof, and moreover to the rear end of said excavator, a gate or tail board I, is hinged so as to be capable of being turned outward, whenever it may be desirable, the same being secured at its lower end by a catch *f*, or other suitable contrivance.

For the purpose of regulating the depth which the front edge of the excavator R may enter the earth or ground of ordinary density, I firmly attach, (by rivets or otherwise) to each vertical side of it, (the said excavator) a strong metallic bar K or K', the top part of each being bent outward at a right angle, so as to serve as a stop or bearing to rest respectively upon the top of the side timbers A. For the purpose of attaining a greater nicety of adjustment of the said edge, a set screw, g, is made to pass vertically through each horizontal part of the bars K, K', as seen in the drawings. Furthermore, the rear part of the excavator may be supported by similar contrivances, attached to the said vertical sides near to their rear ends, or it may be sustained by means of projections or lugs extending respectively from the outer sides of the excavator and from the inner sides of the frame A, and properly arranged thereon.

Having described the construction of my improved machine, I will now describe the operation.

Suppose the parts of the machine to be arranged as in red lines and a team of sufficient power to be attached to the tongue of the machine, and a horse or other animal to be placed a short distance in advance of the said team, and connected with the rope F. Under this state of things we cause the team attached to the tongue of the machine to move forward a few feet or until the excavator is partially or entirely filled with earth; when sufficiently filled we stop such team, and start the animal attached to the rope F, and cause it (the said animal) to move forward until the excavator has been raised to its desired elevation, or such as to allow a cart to be backed under it. We then unlatch the gate or tail board f, and allow the dirt or earth to fall into the said cart; the cart having been drawn away, we next cause the draft on the rope F, to be slackened, and the excavator by the force of gravity descends to the precise spot, from which it had been elevated, and is again ready to be filled.

From the above it will be seen, that the herein described machine is not only very simple in construction, as well as very little liable to get out of repair, but very efficient in operation.

Having thus described my improvements in excavators I shall state my claims as follows:

1. In combination with an excavator frame constructed as described, having the side timbers braced in front only, I claim four wheels, when arranged in relation to the said frame substantially as described, so that a common cart may either be backed between the hind wheels or pushed over said wheels and frame, under the excavator, when the same is hoisted to be discharged, as specified.

2. The combination of an excavator with a frame having the rear ends of each of the side timbers bifurcated for the reception of a wheel, the same being arranged to turn on a journal or pin extending transversely through the two forks, as described.

3. I claim the peculiar arrangement of hanging the excavator to the frame by means of arms the same being so pivoted at their ends respectively to the excavator and side timbers as that they shall be exposed to a tensile strain in the draft line or thereabout during the excavating operation of the machine, substantially as shown and described.

WM. HAMILTON.

Witnesses:
F. P. HALE, Jr.,
ARTHUR NEILL.